June 16, 1959     W. CASTLES, JR     2,890,570
POWER UNIT FOR THE CONVERSION OF HEAT ENERGY
OF FLUIDS INTO MECHANICAL ENERGY Filed Oct. 14, 1952     2 Sheets-Sheet 1

Inventor
WALTER CASTLES, JR.,

By
Attorney

June 16, 1959
W. CASTLES, JR
2,890,570
POWER UNIT FOR THE CONVERSION OF HEAT ENERGY
OF FLUIDS INTO MECHANICAL ENERGY
Filed Oct. 14, 1952
2 Sheets-Sheet 2
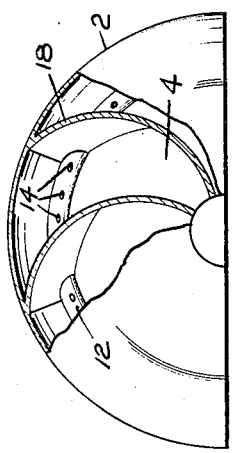
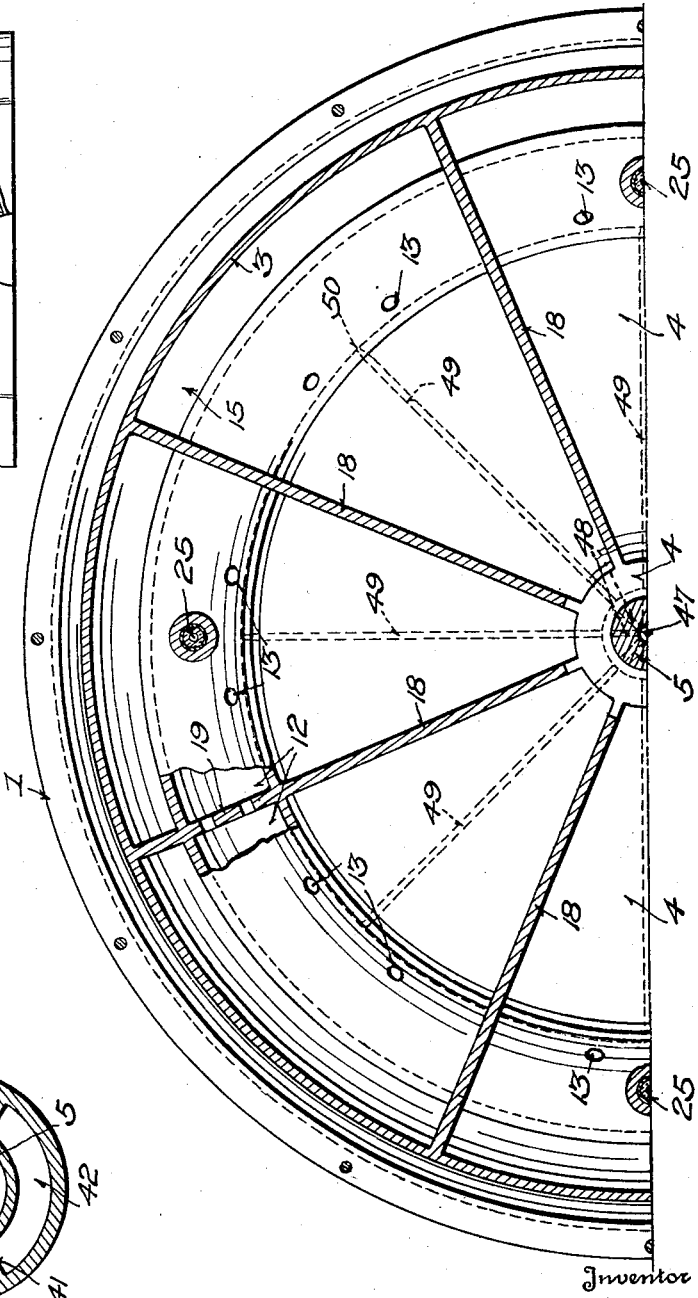
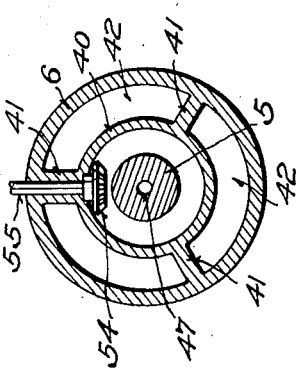
Inventor
WALTER CASTLES, JR.,
By Edw. T. Newton
Attorney

United States Patent Office 2,890,570
Patented June 16, 1959

2,890,570

POWER UNIT FOR THE CONVERSION OF HEAT ENERGY OF FLUIDS INTO MECHANICAL ENERGY

Walter Castles, Jr., Atlanta, Ga., assignor to Georgia Tech Research Institute, Atlanta, Ga., a corporation of Georgia Application October 14, 1952, Serial No. 314,594

6 Claims. (Cl. 60—39.35)

This invention relates to a power unit and more particularly to a unit for converting heat energy of gases to mechanical energy.

This application is a continuation-in-part of my copending application Serial No. 21,231, filed April 15, 1948, for Power Unit, now abandoned.

Units for the jet propulsion of aircraft generally compress air prior to combustion with the fuel to give a large volume of combustion products at a high pressure to drive a gas turbine. The turbine in most instances supplies the power necessary to drive the compressor. The gas discharged from the compressor is still at a relatively high pressure and is ejected through a nozzle at high velocities to supply the required thrust.

When centrifugal compressors are used to compress the intake air, very close tolerances between the impeller and the compressor housing are required to prevent leakage from the discharge to the intake of the compressor. Leakage through the close tolerances is also prevented by discharging the air from the impeller at extremely high velocities but relatively low pressures. The air moving at extremely high velocities is introduced into a diffuser in which the kinetic energy of the gas is converted to mechanical energy in the form of a relatively large volume of gas at a high pressure.

The very high velocity of the gas discharged from the impeller of the compressor causes large power losses in the diffuser. These losses are the result of the extreme turbulence in the diffuser and high skin friction resulting from the gas flowing at a high velocity over stationary surfaces. If a turbine type compressor is employed in place of a centrifugal compressor, the same problems are encountered. High relative velocities between the gas and the blades of the turbine are necessary for compression of the gas, and the gas discharged from the blades enters a stationary diffuser zone in which its kinetic energy is converted into mechanical energy in the form of gas at an increased pressure.

It is an object of this invention to provide apparatus for the conversion of heat energy to mechanical energy in the form of a gas at a high velocity.

Another object of this invention is to produce apparatus for efficiently converting heat energy to mechanical energy.

Still another object of this invention is to provide apparatus for the conversion of heat energy of gases to mechanical energy in which losses resulting from turbulence and skin friction are reduced.

It is also an object of this invention to provide a simple machine which may be manufactured at low cost having few parts and a corresponding increase in reliability and reduction of maintenance cost.

With these and other objects in mind which will become apparent in the following description, this invention resides in a rotor through which air passes and is compressed to a maximum static pressure at the periphery. Fuel is burned in a combustion chamber rotating integrally with the rotor at the periphery to heat the compressed air. The rotor is designed to utilize the previously imparted angular momentum and a small portion of the energy of the gases to supply energy for compression with a minimum of losses and leaving a maximum amount of energy in the gases for whatever purpose desired, such as driving a turbine or jet propulsion.

In the drawings:

Figure 3 is a vertical sectional view along the section line 3—3 in Figure 1 illustrating the face of the rotor; and Figure 4 is a sectional view along the section line 4—4 in Figure 1 showing the air intake for the apparatus.

Figure 5 is a view of a detail.

Figure 1:
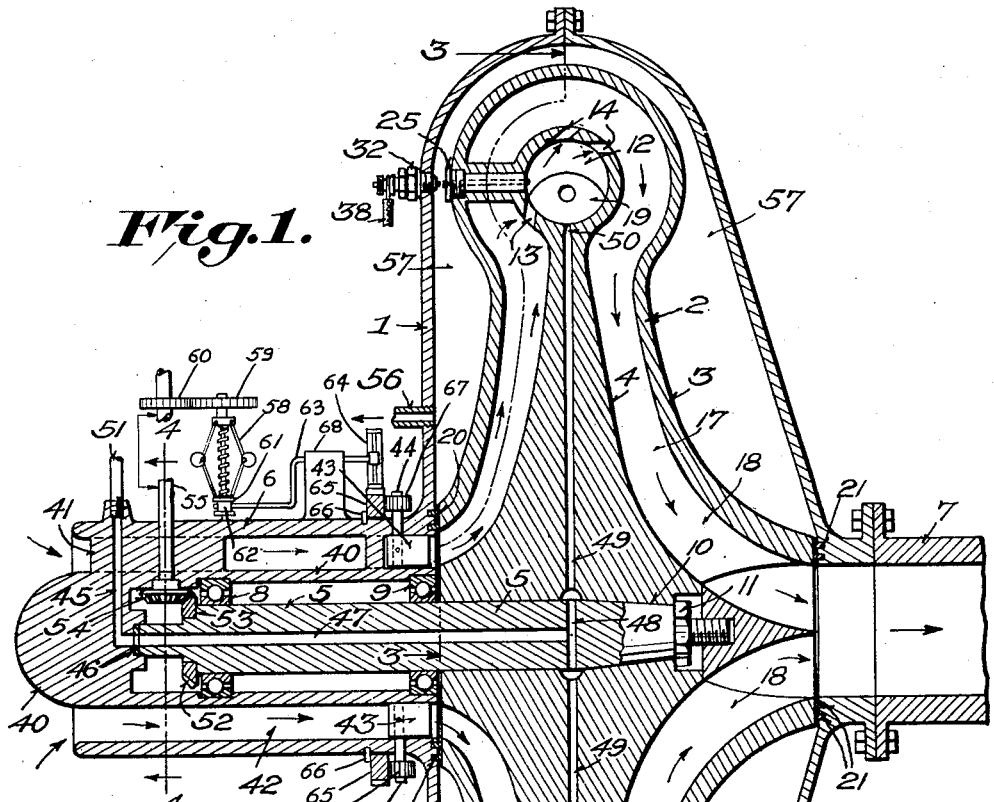
Figure 1 is a vertical sectional view of the apparatus comprising this invention.
Figure 6:
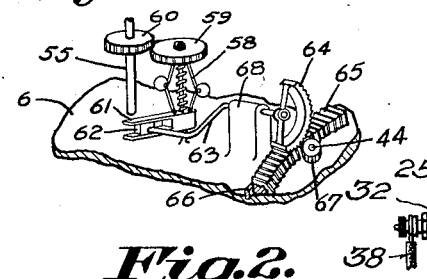
Figure 6 is a view of a detail.

Referring to Figure 1, a cover 1 encases a rotor, indicated generally by 2, formed by a casing 3 integral with a disc 4 mounted on a rotating shaft 5. Cover 1 is connected at its inlet end, at the left of the drawing in Figure 1, with an intake tube 6 through which the air used in the operation of the apparatus passes. Cover 1 is also connected to an outlet tube 7, opposite inlet tube 6, for the discharge of combustion products. Inlet tube 6 provides a support for bearings 8 and 9 in which shaft 5 turns, in the manner hereinafter described.

In the specific application of the invention illustrated in Figure 1, disc 4 is mounted on shaft 5 by means of a taper 10 and nut 11. Disc 4 is keyed to the shaft by any suitable means to permit it to rotate as a unit with shaft 5. Disc 4 is a substantially flat member tapering from its center towards combustion chamber 12 located at its outer edge. Inlet ports 13 in the walls of the chamber 12 are substantially tangential thereto and allow air passing through the apparatus to enter the combustion chamber. The products of combustion pass through outlet ports 14 to mix with the main body of air passing through the power unit.

Casing 3 encloses the disc 4 and is spaced therefrom to provide a passage indicated generally by 15. Passage 15 is divided into a compressor section 16 consisting of that part of the passage between the inlet to the rotor 2 and the outer periphery of the passage 15, and a diffuser section 17 between the outer periphery surrounding the combustion chamber 12 and the outlet from the power unit. A series of radial vanes 18 extend across the passages and are rigidly attached to the casing 3 and disc 4 to divide passage 15 into a plurality of compartments. The vanes 18 in the diffuser section 17 of passage 15 may be helically curved near the outlet from the power unit, as shown in Fig. 5, to eliminate any angular motion of the gases discharged from the outlet tube 17 of the power unit.

Radial walls 19, corresponding to vanes 18, may be provided to divide the combustion chamber 12 into a series of compartments. It is preferred that walls 19 be apertured to allow passage from one compartment of the combustion chamber 12 to another.

Vanes 18, being attached to casing 3 and disc 4, hold those members rigidly together as a unitary structure. There is no relative motion between the disc 4, and consequently combustion chamber 12, and casing 3. Casing 3 does, however, rotate rapidly relative to the cover 1. Laybrinth seals 20 and 21 permit free rotation of the casing 3 and prevent leakage from passage 15 into the space between the cover 1 and the casing 3.

Figure 2:
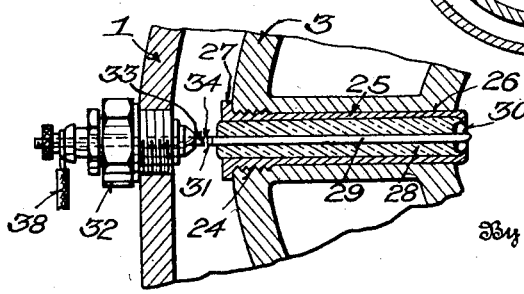
Figure 2 is a sectional view of a spark lead forming part of the structure of this invention.

Referring to Figure 2, casing 3 is drilled and tapped at 24 for the reception of a spark lead 25. Spark lead 25 passes through the wall of combustion chamber 12 at 26 to provide the necessary spark for ignition of the fuel therein. Spark lead 25 consists of a metal seal 27 within which an insulator 28 is inserted. Insulator 28 is centrally apertured for the reception of an electrode 29 which forms a spark gap 30 across the space between its inner end and the metal seal 27. Spark lead 25 may, of course, be so positioned that it passes through a vane 18 and receives additional support therefrom. In the drawings, however, a spark lead 25 is spaced between adjacent vanes 18 to clarify the illustration of the structure.

A high potential source of electricity is provided in alignment with the outer end 31 of electrode 29 by a bushing 32 passing through the cover 1. Within the bushing 32, and insulated therefrom, is a terminal 33. Terminal 33 extends into the space between the cover 1 and casing 3 to make contact, across a spark gap 34 with the inner end of electrode 29. A line 38 connects terminal 33 with a high potential source of electricity.

A sleeve 40, solid at its inlet end, is centrally supported by webs 41 within inlet tube 6 to provide an annular inlet 42 between the outer surface of sleeve 40 and inner surface of inlet tube 6 for air passing into the rotor 2. Sleeve 40 is centrally drilled at its outlet end for the reception of bearings 8 and 9 in which shaft 5 rotates. Adjustable fins 43 are provided at the outlet end of the annular inlet 42 to impart a rotating motion to the air discharged from the inlet to the rotor 2. Levers 44 from fins 43 provide means for controlling the inclination of the fins.

A feed line 45 is drilled through inlet tube 6, one of the webs 41, and the solid portion of the sleeve 40 to its center. The feed line 45 makes a right angle turn at the center of the sleeve and extends in a direction co-axial with the shaft 5. Any conventional type of slip connection 46 is provided to connect feed line 45, in a fluid tight manner, with a central conduit 47 passing through the shaft 5. Conduit 47 is connected with radial conduits 48 in shaft 5 near the end remote from slip connection 46. Radial conduits 48 communicate with radial passages 49 in disc 4 opening through jets 50 into combustion chamber 12. A combination of feed line 45, conduits 47 and 48 and passages 49 provide a feed line for the introduction of fuel into the combustion chamber 12 from a line 51 connected with the source of fuel.

A beveled gear 52 is keyed on a shoulder 53 at the inlet end of shaft 5. Gear 52 meshes with a beveled gear 54 connected with a spindle 55 which also passes through one of the webs 41 to provide a power take-off from shaft 5. A vacuum pump may be connected with nipple 56 providing access to the space 57 between the cover 1 and rotor 2. A conventional type of fly ball governor driven by spindle 55 may be employed to actuate shafts 44 and adjust the position of fins 43, as shown in Fig. 1. The flyball governor 58 is driven by gear 59 which is operably engaged with gear 60 which is secured to spindle 55 in a conventional manner. The lower fork 61 on governor 58 has sliding block 62 to be raised or lowered in response to the speed of rotation of the governor. One end of crank 63 is rotatably mounted within block 62. The other end of crank 63 is securely mounted to sector gear 64 which is operably engaged with ring gear 65 which is rotatably mounted on the outer periphery of inlet tube 6 and is positioned thereon by means of snap ring 66 and the pinion gears 67 which are permanently secured to the plurality of shafts 44. The crank 63 is positioned and journaled in bracket 68 which is made integral with inlet tube 6. During normal operation, spindle 55 is driven at a speed proportional to the speed of the casing 3. The speed of rotation is transmitted from spindle 55 through gears 60 and 59 to the governor 58. As the weights on the governor 58 are moved outward by centrifugal force the lower fork 61 is raised causing crank 63 to rotate, this rotation in turn is transmitted to sector gear 64 which causes ring gear 65 to rotate about tube 6 and simultaneously rotating pinion gears 67 which through levers 44 cause fins 43 to assume a new position in relation to vanes 18.

In operation, the power unit may be started by turning the unit with a suitable starting motor driving shaft 55 or by introducing a blast of compressed air into the annular inlet 42. Fins 43 will impart a rotational motion to the air which impinges against the vanes 18 and then turns the rotor 2. While vanes 18 are shown as radial, they may, of course, be curved to reduce the turbulence of the entering air. Fuel is introduced through feed lines 49 into the combustion chamber 12 at this time. As the rotor turns, the electrode 29 of spark lead 25 will come into alignment with terminal 33 to start the combustion of the fuel.

Part of the air flowing through compressor section 16 will enter ports 13 and be heated directly by the combustion of the fuel. The greater portion of the air, however, will pass around the combustion chamber 12 and be heated by contact with its walls and by mixture with the products of combustion escaping through ports 14.

As the air passes through passage 15 around the combustion chamber 12 into the diffuser section 17 and then to the outlet tube 7, it imparts the angular momentum to the rotor necessary to compress the air in the compressor section and overcome bearing and friction losses. Because of the high temperature in the diffuser section 17 of passage 15, the gases at any given distance from the axis of rotation of the rotor will be more dense in the compressor section than in the diffuser section of passage 15. Once rotation of the rotor has been started by a blast of air and combustion of the fuel within the combustion chamber 12 has commenced, the difference in density of the gas will cause flow to continue in the direction from the inlet to the outlet of the power unit.

The kinetic and pressure energy of the combustion products is decreased by the amount necessary to compress the air, overcome bearing friction, etc., as they pass from the region surrounding the combustion chamber towards the axis of rotation and outlet tube 7. The remaining energy is available in the form of a large volume flow of gas with a high velocity head. The gas discharged through outlet connection 7 may be employed in a gas turbine to drive a shaft or in a nozzle for jet propulsion.

It will be noted that the gas flowing through passage 15 is in contact with surfaces moving at substantially the same rate as the gases. The skin friction of these gases is, consequently, greatly reduced. Moreover, it is not necessary to provide extremely close tolerances between rotating and stationary parts of the housing to prevent leakage from the high pressure to the low pressure side of the apparatus.

Skin friction and heat losses on the outer surface of the casing 3 are reduced by the evacuation of the space 57 between the cover and casing 3. The evacuation may be accomplished by any suitable vacuum pump connected with nipple 56. The vacuum pump may be driven from power take-off 55 once rotation of the shaft 5 has started. The low pressure within space 57 eliminates most of the skin friction losses arising from the rapid rotation of casing 3.

Once rotation of the power unit has started it will be desirable to adjust the vanes 43 to the proper position depending on the rate of rotation of the rotor and the mass of air entering the power unit. These vanes may be adjusted manually or may be controlled by a governor driven by the power take-off 55. Proper positioning of the vanes decreases losses arising from turbulence of the air entering the rotor, and the vanes impart an initial angular momentum to drive the rotor. Angular momentum of the combustion products leaving the rotor may be reduced by a helical twist, as shown in Fig. 5, on vanes 18 near the outlet tube 7, thereby further increasing the efficiency of converting the energy into a readily available form.

An apparatus is described herein which efficiently converts the energy in a fuel into mechanical energy in the products of combustion. This mechanical energy may be in the form of a large volume flow of gas at a high velocity suitable for discharge through a nozzle to produce a blast of gas for jet propulsion.

The apparatus herein described greatly reduces the power losses resulting from gases at high velocities passing over stationary surfaces by the provision of a rotating combustion chamber which moves at substantially the same angular velocity as the gases. Moreover, the losses resulting from friction between the outer surfaces of the rotor and the atmosphere are eliminated by operating the rotor within an evacuated chamber. Losses are further reduced in the present apparatus since it is not necessary to move the gases at extremely high velocities relative to the walls of the gas passages to prevent leakage through the clearances between rotating and stationary parts.

While this invention has been described in detail with reference to a specific structure, it is to be understood that the concept of this invention is not limited to those details, but is limited only by the scope of the appended claims.

I claim:

1. In apparatus for the conversion of heat energy of a fluid into mechanical energy, a rotor, said rotor including a disc, a rotating shaft, said disc axially supported on said shaft for rotation therewith, a wall on the outer periphery of said disc defining a ring-shaped combustion chamber, said shaft having a fuel conducting bore, said disc having a plurality of radial fuel lines therein each communicating said bore with said ring-shaped combustion chamber, said rotor having a casing enclosing said disc in spaced relation thereto, said casing terminating short of said shaft to form an inlet and outlet to the space between the casing and disc, a plurality of radial vanes rigidly connecting said casing to said disc so as to define a plurality of radial passageways each communicating said inlet with said outlet, a cover enclosing said rotor, an annular intake member joined to said cover, said intake member having the interior thereof in communication with said inlet, means for rotatably supporting said shaft in said intake member, deflector members adjustably mounted at the outlet end of said intake member to impart rotary motion to fluid entering said rotor, a power take-off from said shaft, a governor actuated by said power take-off to control the position of said deflector members in the intake member, said fluid adapted to be centrifugally compressed in the inlet side of said rotor by rotation thereof, said combustion chamber wall having inlet ports adapted to receive a portion of the centrifugally compressed fluid from said passageways for mixing with fuel therein for combustion thereof, said combustion chamber wall having outlet ports for exhausting the products of combustion into said passageways to form an admixture with fluid by-passing said combustion chamber inlet ports, said admixture adapted for centripetal expansion on the outlet side of said rotor to be expelled from said outlet at relatively high volume and under high pressure, said vanes being helically curved near said outlet so as to reduce the angular motion of fluid leaving said rotor.

2. In apparatus for the conversion of heat energy of a fluid into mechanical energy, a rotor, said rotor including a disc, a rotating shaft, said disc axially supported on said shaft for rotation therewith, a wall on the outer periphery of said disc defining a ring-shaped combustion chamber, said shaft having a fuel conducting bore, said disc having a plurality of radial fuel lines therein each communicating said bore with said ring-shaped combustion chamber, said rotor having a casing enclosing said disc in spaced relation thereto, said casing terminating short of said shaft to form an inlet and outlet to the space between the casing and disc, a plurality of radial vanes rigidly connecting said casing to said disc so as to define a plurality of radial passageways each communicating said inlet with said outlet, said inlet adapted to receive fluid at a relatively high velocity but low pressure, said fluid adapted to be centrifugally compressed in the inlet side of said rotor by rotation thereof, said combustion chamber wall having inlet ports adapted to receive a portion of the centrifugally compressed fluid from said passageways for mixing with fuel therein for combustion thereof, said combustion chamber wall having outlet ports for exhausting the products of combustion into said passageways to form an admixture with fluid by-passing said combustion chamber inlet ports, said admixture adapted for centripetal expansion on the outlet side of said rotor to be expelled from said outlet at relatively high volume and under high pressure, said vanes being helically curved near said outlet so as to reduce the angular motion of fluid leaving said rotor.

3. In apparatus for the conversion of heat energy of a fluid into mechanical energy, a rotor, said rotor including a disc, a rotating shaft, said disc axially supported on said shaft for rotation therewith, a wall on the outer periphery of said disc defining a ring-shaped combustion chamber, said shaft having a fuel conducting bore, said disc having a plurality of radial fuel lines therein each communicating said bore with said ring-shaped combustion chamber, said rotor having a casing enclosing said disc in spaced relation thereto, said casing terminating short of said shaft to form an inlet and outlet to the space between the casing and disc, a plurality of radial vanes rigidly connecting said casing to said disc so as to define a plurality of radial passageways each communicating said inlet with said outlet, said inlet adapted to receive fluid at a relatively high velocity but low pressure, adjustable means for angularly directing the fluid into said inlet against said vanes so as to maintain rotation of said casing and disc, said fluid adapted to be centrifugally compressed in the inlet side of said rotor by rotation thereof, a cover enclosing said rotor, means for rotatably supporting said shaft from said cover, ignition spark means electrically communicating the interior of said combustion chamber with the exterior of said rotor casing, ignition energizing means fixed to said cover for periodically contacting said ignition spark means exteriorly of said rotor upon rotation thereof, said combustion chamber wall having inlet ports adapted to receive a portion of the centrifugally compressed fluid from said passageways for mixing with fuel therein for combustion thereof, said combustion chamber having outlet ports for exhausting the products of combustion into said passageways to form an admixture with fluid by-passing said combustion chamber inlet ports, said admixture adapted for centripetal expansion on the outlet side of said rotor to be expelled from said outlet at relatively high volume and under high pressure.

4. In apparatus for the conversion of heat energy of a fluid into mechanical energy, a rotor, said rotor including a disc, a rotating shaft, said disc axially supported on said shaft for rotation therewith, a wall on the outer periphery of said disc defining a ring-shaped combustion chamber, said shaft having a fuel conducting bore, said disc having a plurality of radial fuel lines therein each communicating said bore with said ring-shaped combustion chamber, said rotor having a casing enclosing said disc in spaced relation thereto, said casing terminating short of said shaft to form an inlet and outlet to the space between the casing and disc, a plurality of radial vanes rigidly connecting said casing to said disc so as to define a plurality of radial passageways each communicating said inlet with said outlet, said inlet adapted to receive fluid at a relatively high velocity but low pressure, adjustable means for angularly directing the fluid into said inlet against said vanes so as to maintain rotation of said casing and disc, said fluid adapted to be centrifugally compressed in the inlet side of said rotor by rotation thereof, said combustion chamber wall having inlet ports adapted to receive a portion of the centrifugally compressed fluid from said passageways for mixing with fuel therein for combustion thereof, said combustion chamber wall having outlet ports for exhausting the products of combustion into said passageways to form an admixture with fluid by-passing said combustion chamber inlet ports, said admixture adapted for centripetal expansion on the outlet side of said rotor to be expelled from said outlet at relatively high volume and under high pressure, said vanes being helically curved near said outlet so as to reduce the angular motion of fluid leaving said rotor.

5. In apparatus for the conversion of heat energy of a fluid into mechanical energy, a rotor, said rotor including a disc, a rotating shaft, said disc axially supported on said shaft for rotation therewith, a wall on the outer periphery of said disc defining a ring-shaped combustion chamber, said shaft having a fuel conducting bore, said disc having a plurality of radial fuel lines therein each communicating said bore with said ring-shaped combustion chamber, said rotor having a casing enclosing said disc in spaced relation thereto, said casing terminating short of said shaft to form an inlet and outlet to the space between the casing and disc, a plurality of radial vanes rigidly connecting said casing to said disc so as to define a plurality of radial passageways each communicating said inlet with said outlet, said inlet adapted to receive fluid at a relatively high velocity but low pressure, adjustable means for angularly directing the fluid into said inlet against said vanes so as to maintain rotation of said casing and disc, means responsive to the speed of rotation of said shaft for controlling the directivity of said adjustable means, said fluid adapted to be centrifugally compressed in the inlet side of said rotor by rotation thereof, said combustion chamber wall having inlet ports adapted to receive a portion of the centrifugally compressed fluid from said passageways for mixing with fuel therein for combustion thereof, said combustion chamber wall having outlet ports for exhausting the products of combustion into said passageways to form an admixture with fluid by-passing said combustion chamber inlet ports, said admixture adapted for centripetal expansion on the outlet side of said rotor to be expelled from said outlet at relatively high volume and under high pressure, said vanes being helically curved near said outlet so as to reduce the angular motion of fluid leaving said rotor.

6. In apparatus for the conversion of heat energy of a fluid into mechanical energy, a rotor, said rotor including a disc, a rotating shaft, said disc axially supported on said shaft for rotation therewith, a wall on the outer periphery of said disc defining a ring-shaped combustion chamber, said shaft having a fuel conducting bore, said disc having a plurality of radial fuel lines therein each communicating said bore with said ring-shaped combustion chamber, said rotor having a casing enclosing said disc in spaced relation thereto, said casing terminating short of said shaft to form an inlet and outlet to the space between the casing and disc, a plurality of radial vanes rigidly connecting said casing to said disc so as to define a plurality of radial passageways each communicating said inlet with said outlet, said inlet adapted to receive fluid at a relatively high velocity but low pressure, adjustable means for angularly directing the fluid into said inlet against said vanes so as to maintain rotation of said casing and disc, means responsive to the speed of rotation of said shaft for controlling the directivity of said adjustable means, said fluid adapted to be centrifugally compressed in the inlet side of said rotor by rotation thereof, a cover enclosing said rotor, means for rotatably supporting said shaft from said cover, ignition spark means electrically communicating the interior of said combustion chamber with the exterior of said rotor casing, ignition energizing means fixed to said cover for periodically contacting said ignition spark means exteriorly of said rotor upon rotation thereof, said combustion chamber wall having inlet ports adapted to receive a portion of the centrifugally compressed fluid from said passageways for mixing with fuel therein for combustion thereof, said combustion chamber wall having outlet ports for exhausting the products of combustion into said passageways to form an admixture with fluid by-passing said combustion chamber inlet ports, said admixture adapted for centripetal expansion on the outlet side of said rotor to be expelled from said outlet at a relatively high volume and under high pressure, said vanes being helically curved near said outlet so as to reduce the angular motion of fluid leaving said rotor.

References Cited in the file of this patent

UNITED STATES PATENTS

| | | |
|---|---|---|
| 1,505,080 | Shishkoff | Aug. 12, 1924 |
| 1,868,143 | Heinze | July 19, 1932 |
| 2,256,198 | Hahn | Sept. 16, 1941 |
| 2,444,742 | Lutjen | July 6, 1948 |
| 2,490,064 | Kollsman | Dec. 6, 1949 |
| 2,514,874 | Kollsman | July 11, 1950 |
| 2,514,875 | Kollsman | July 11, 1950 |

FOREIGN PATENTS

| | | |
|---|---|---|
| 275,677 | Great Britain | Mar. 22, 1928 |
| 598,774 | Great Britain | Feb. 26, 1948 |

OTHER REFERENCES

"Steam and Gas Turbines," by A. Stodola, translated by L. C. Lowenstein, published 1927 by McGraw-Hill Book Co., New York, New York, volume II, pages 1219, 1220 and 1221.